United States Patent [19]

Baxter

[11] Patent Number: 4,789,181

[45] Date of Patent: Dec. 6, 1988

[54] WHEELED VEHICLE SUSPENSION

[75] Inventor: Bobby G. Baxter, Warren County, Mo.

[73] Assignee: The Binkley Company, Warrenton, Mo.

[21] Appl. No.: 9,503

[22] Filed: Feb. 2, 1987

[51] Int. Cl.⁴ .............................................. B60G 5/00
[52] U.S. Cl. .................................... 280/681; 280/687; 280/716
[58] Field of Search ............... 280/677, 678, 679, 680, 280/681, 687, 716

[56] References Cited

U.S. PATENT DOCUMENTS 2,773,698 12/1956 Slemmons et al. .................. 280/678
3,692,325 9/1972 Gouirano ............................ 280/678
4,082,316 4/1978 Raidel ................................. 280/681

FOREIGN PATENT DOCUMENTS 64557 3/1925 Sweden ............................... 280/716

Primary Examiner—Kenneth R. Rice
Attorney, Agent, or Firm—Senniger, Powers, Leavitt and Roedel

[57] ABSTRACT

A suspension for tandem axles of a vehicle comprising a pair of walking beams to which the axles are attached in a manner permitting either beam to swing relative to the other, with an elastomeric interposed between the body of the vehicle and the beams, and with the beams restrained from longitudinal and lateral movement.

25 Claims, 9 Drawing Sheets

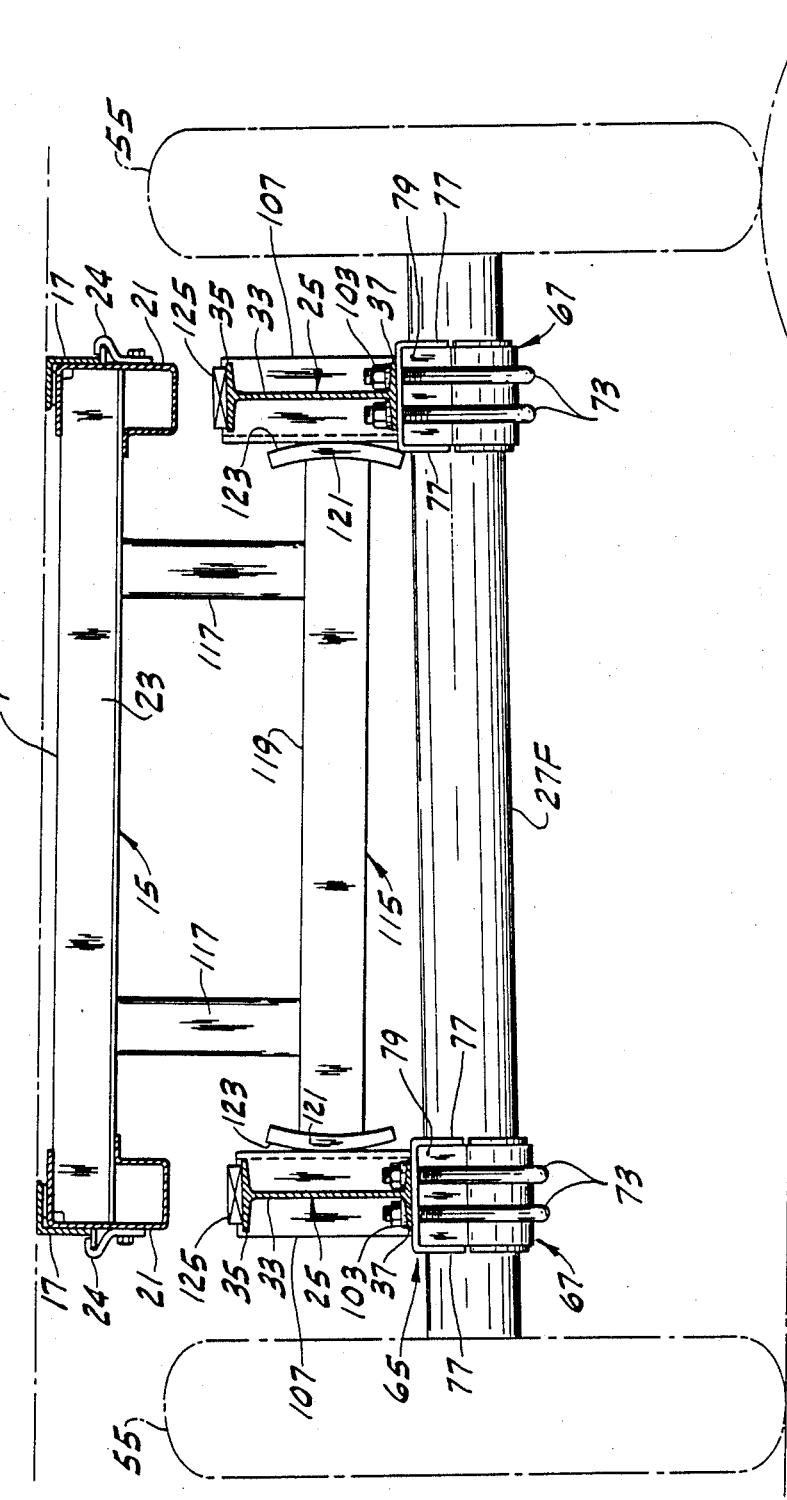

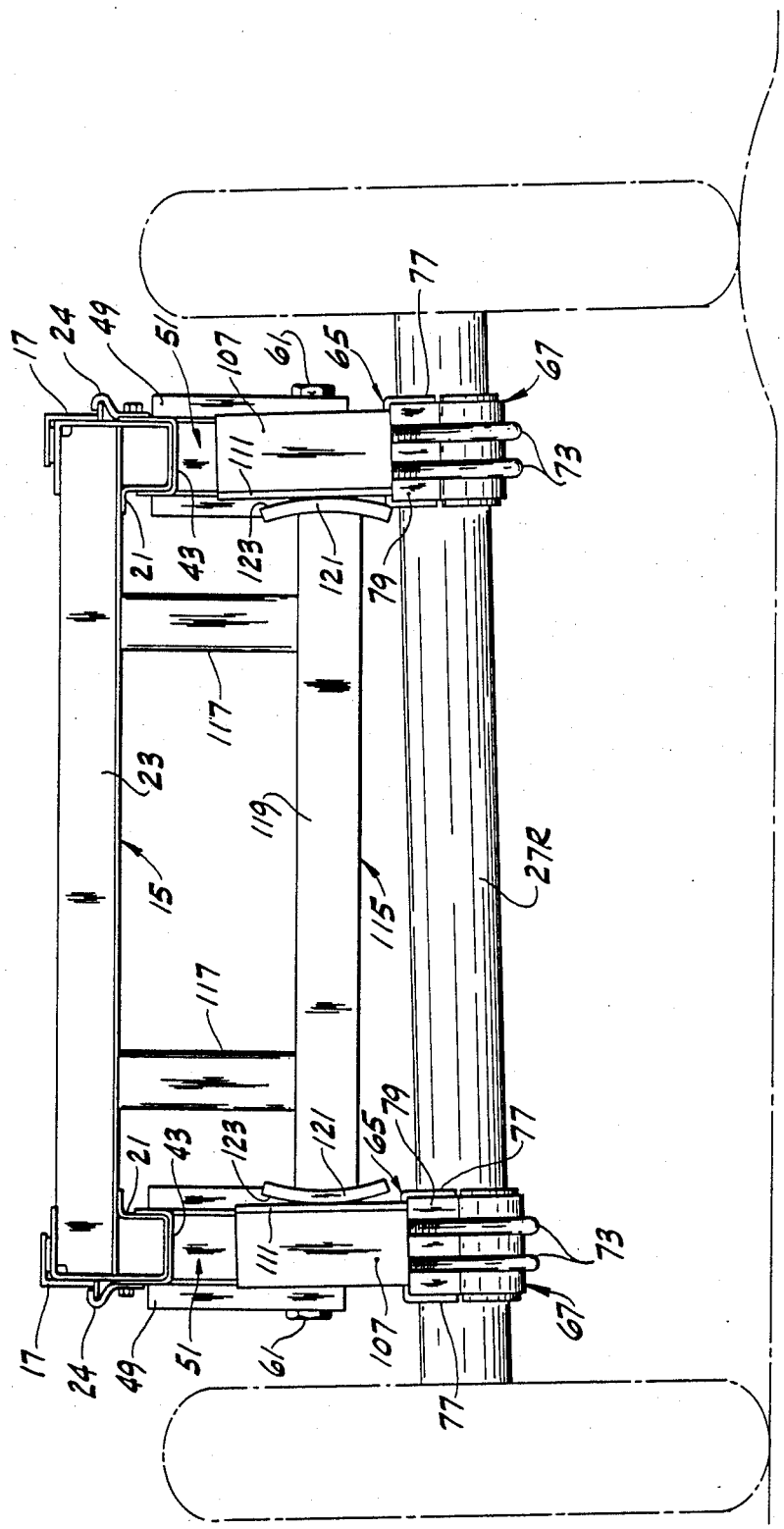

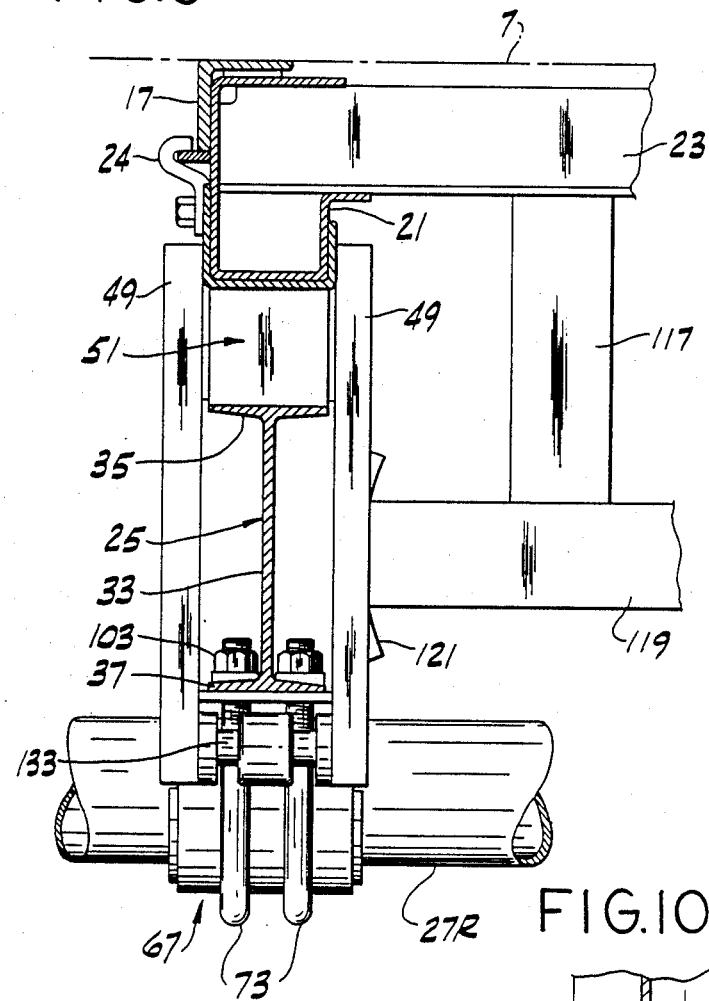
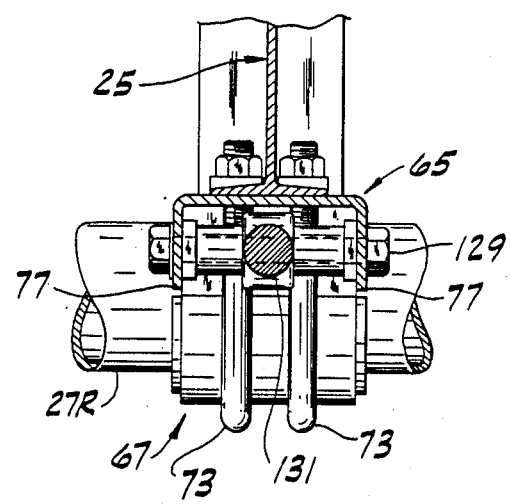

WHEELED VEHICLE SUSPENSION

BACKGROUND OF THE INVENTION

This invention relates to wheeled vehicle suspensions, and more particularly to tandem axle suspensions, which are also referred to as bogies.

The invention is especially concerned with tandem axle suspensions for trailers, involving a suspension of the type referred to as a walking beam suspension, generally comprising a pair of so-called walking beams, one for the right side and the other for the left side of the trailer, and a pair of axles, one constituting a forward axle and the other a rearward axle. Generally, prior walking beam suspensions have been subject to high stresses in the walking beams and have required the use of relatively massive and relatively expensive center pivot joints. While prior spring suspensions of the leaf spring type are not subject to these problems, other problems may be encountered in their use, such as hard riding, brake hop, instability and loss of control during braking, cornering and lane changing. With prior leaf spring suspensions, brake hop may occur when, on application of the vehicle's brakes, a condition called spring wind-up occurs which results in the tires breaking traction or sliding, the springs releasing their energy, the cycle of wind-up, traction breaking or sliding and spring energy release being repeated over and over. Instability results generally from the free play in the suspension, which is the distance or clearance between the bottom of the springs and the bolts which hold the suspension from falling out if the vehicle is lifted. In a typical trailer, the free play may be approximately two inches, which is of such magnitude as to create a tendency for the trailer to turn over. Prior leaf spring suspensions have not been wholly successful in economically obtaining equal axle loading to reduce road shock, and have also involved problems in carrying out adjustment of axle alignment.

SUMMARY OF THE INVENTION

Among the several objects of this invention may be noted the provision of an improved suspension of the tandem axle walking beam type wherein the walking beams are subjected to lower stress and which eliminates any need for massive, expensive center pivot joints for the beams, provides improved handling and a smoother and safer ride, avoids brake hop and provides excellent stability and control during braking, cornering and lane changing, and provides for more nearly perfect equalization of axle loads both statically and dynamically and for simplification of axle alignment; and the provision of such a suspension which is economical to manufacture and install, of lower weight, and more economical to maintain, and which eliminates risk of spring breakage.

While the suspension of this invention is hereinafter described as used on a trailer, and more particularly a van type trailer for hauling dry freight, it is to be understood that suspensions made in accordance with the principles of the invention may be used on other vehicles, e.g. semi trailers, flat bed trailers, reefers, trucks and truck tractors.

In general, a suspension of this invention comprises a pair of walking beams, one for the right side and one for the left side of the vehicle, and a pair of axles, one constituting a forward axle and the other a rearward axle. The forward axle is attached to the beams adjacent their forward ends and the rearward axle is attached to the beams adjacent their rearward ends. Means located generally centrally of the beams mounts the beams toward the sides of the body of the vehicle below the bottom of the body with each beam extending longitudinally of the vehicle and with each beam swingable generally about the center of the length of the beam in a generally vertical plane and also movable up and down relative to the bottom of the body of the vehicle. Elastomeric means interposed between the body of the vehicle and each beam resiliently supports the body on the beams, the elastomeric means bearing the weight of the body and transmitting the weight to the beams generally centrally of the length of the beams. Means is provided for restraining each beam from longitudinal movement and for restraining the beams from lateral movement in the horizontal position of the beams and in angular positions of the beams off horizontal while allowing for the swinging of the beams.

Other objects and features will be in part apparent and in part pointed out hereinafter.

BRIEF DESCRIPTION OF THE DRAWINGS

FIG. 7 is a vertical transverse section generally on line 7—7 of FIG. 2 showing the forward axle of the suspension in an angled position;

FIG. 7A is a rear end view on line 7A—7A of FIG. 2 showing the rearward axle in an angled position;

FIG. 9 is an enlarged vertical transverse section on line 9—9 of FIG. 8; and

FIG. 10 is an enlarged section on line 10—10 of FIG. 8.

Corresponding reference characters indicate corresponding parts throughout the several views of the drawings.

DETAILED DESCRIPTION

Figure 1:
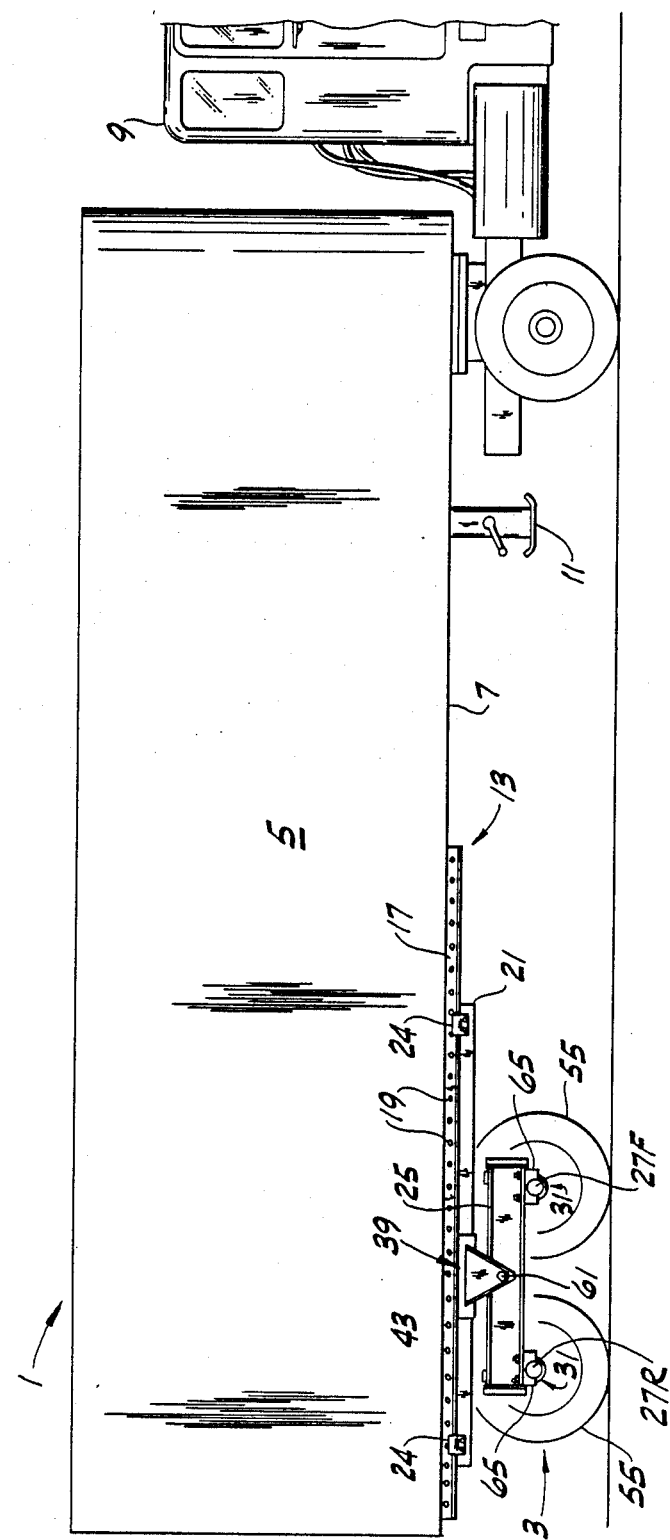
FIG. 1 is a view in side elevation of a trailer equipped with a tandem axle suspension of this invention, with the wheels on the near side of the suspension removed to show detail, and including a showing of a tractor for pulling the trailer, the walking beam on the near side of the suspension being shown in horizontal position.

Referring to FIG. 1 of the drawings, a trailer indicated in its entirety by the reference numeral 1 is shown with a suspension of this invention indicated in its entirety by the reference numeral 3 adjacent its rear end. The trailer, as illustrated, is one in which the body is a van identified by the reference numeral 5, the bottom of the van being indicated at 7. The trailer is shown with its forward end coupled to a tractor 9, and its landing gear is indicated at 11.

Figure 4:
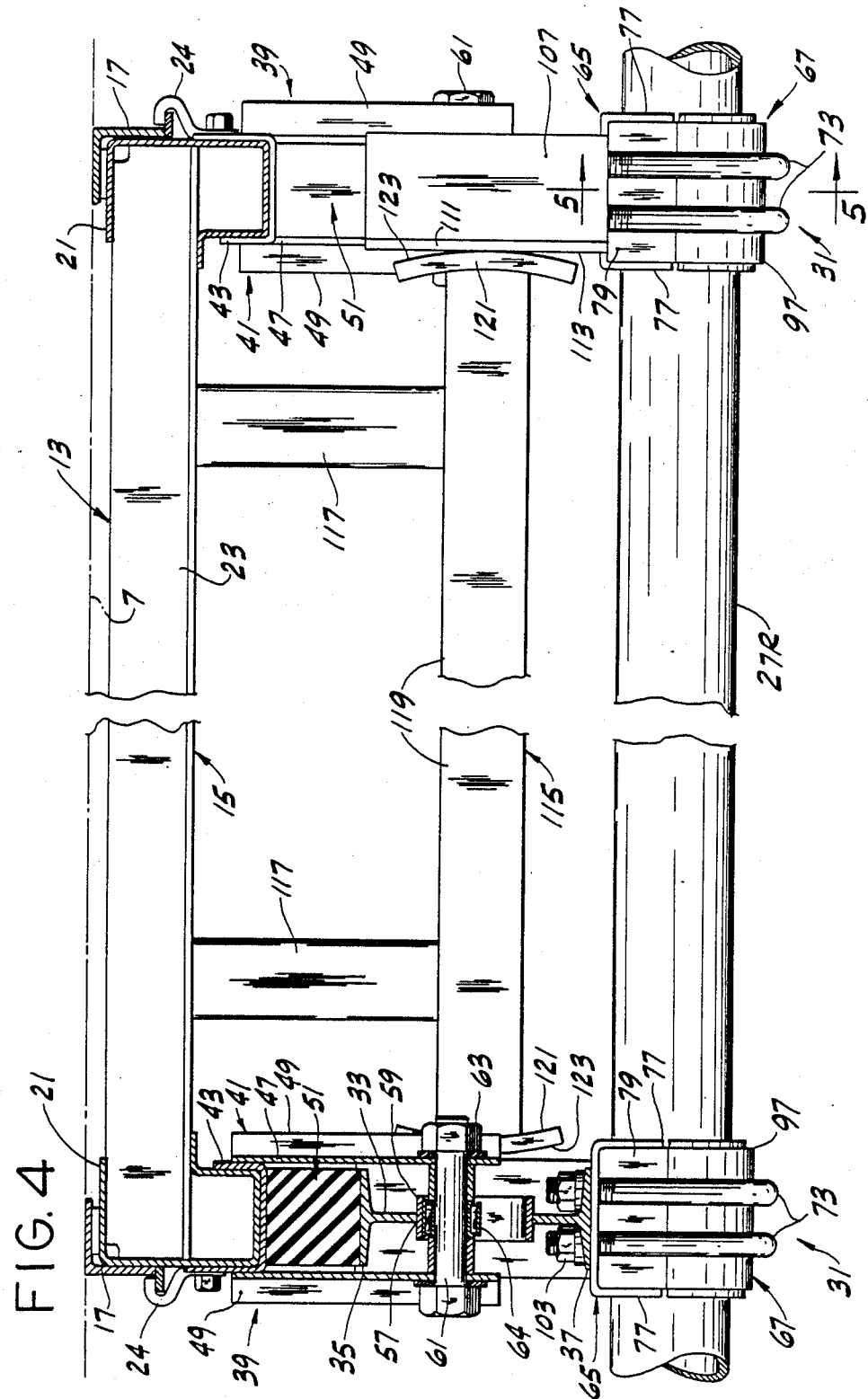
FIG. 4 is a rear end view generally on line 4—4 of FIG. 3, on a larger scale than FIG. 3 with parts broken away in the middle and parts shown in section.

The suspension 3 may be either fixedly secured to the bottom 7 of the body 5 of the trailer 1, without the capability of adjustment of its position longitudinally with respect to the body, or it may be mounted for adjustment longitudinally of the body by means of a slide such as that sold under the trademark LITE-SLIDE by The Binkley Company, of Warrenton, Mo., the assignee of this invention. As herein illustrated, the suspension 3 is mounted for adjustment longitudinally of the body by means of such a slide, indicated its entirety at 13 in FIGS. 1, 2 and 4 and comprising a frame generally designated 15 slidable longitudinally on the bottom of the body on left and right side rails each designated 17 which are affixed to the bottom of the body, the frame being adapted to be locked in various positions of adjustment endwise of the body by locking pins (not shown) engageable in one set of holes 19 of a series of holes in the rails. Basically, the slidable frame 15 comprises left and right side members each designated 21 and cross members one of which is indicated at 23 in FIG. 4 with the side members 21 mounted as indicated at 24 for sliding movement on the rails 17.

Figure 3:
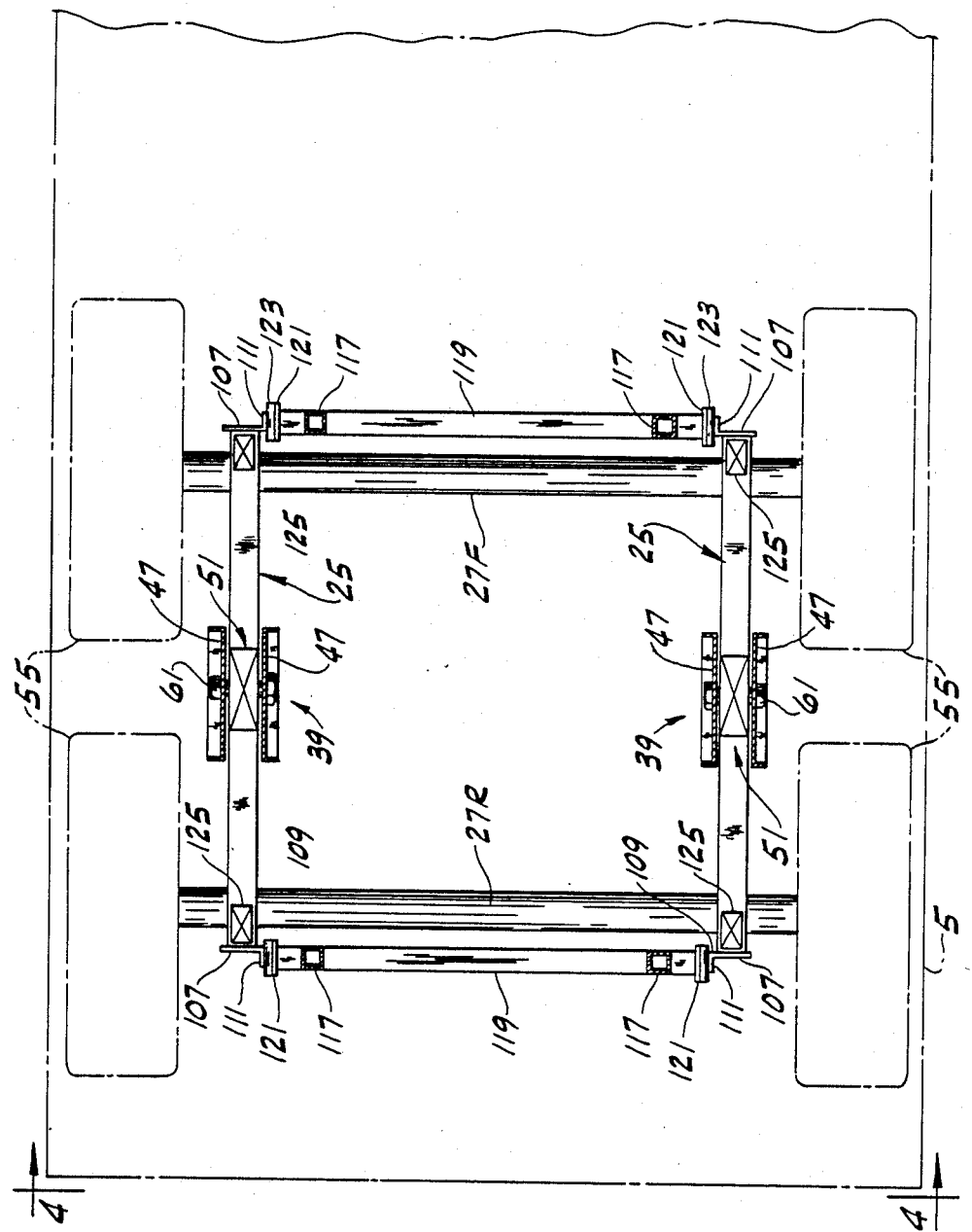
FIG. 3 is a horizontal section on line 3—3 of FIG. 2.

Basically, the suspension 3 comprises a pair of walking beams, each designated 25, one for the right side and the other for the left side of the vehicle, and a pair of axles, shown as round axles, one constituting a forward axle designated 27F and the other a rearward axle designated 27R. These four elements are interconnected to form what amounts to a generally rectangular frame designated in its entirety by the reference numeral 29 in FIG. 3 with the walking beams constituting the sides of the frame and the forward and rearward axles the front and rear of the frame. Each axle is attached to the beams adjacent each end of the axle by a special joint of this invention generally designated 31 which will be subsequently described in detail. As herein illustrated, each of the walking beams is constituted as an I-beam (see particularly FIG. 4) of standard I-beam cross section with a web 33 and upper and lower flanges 35 and 37.

Figure 2:
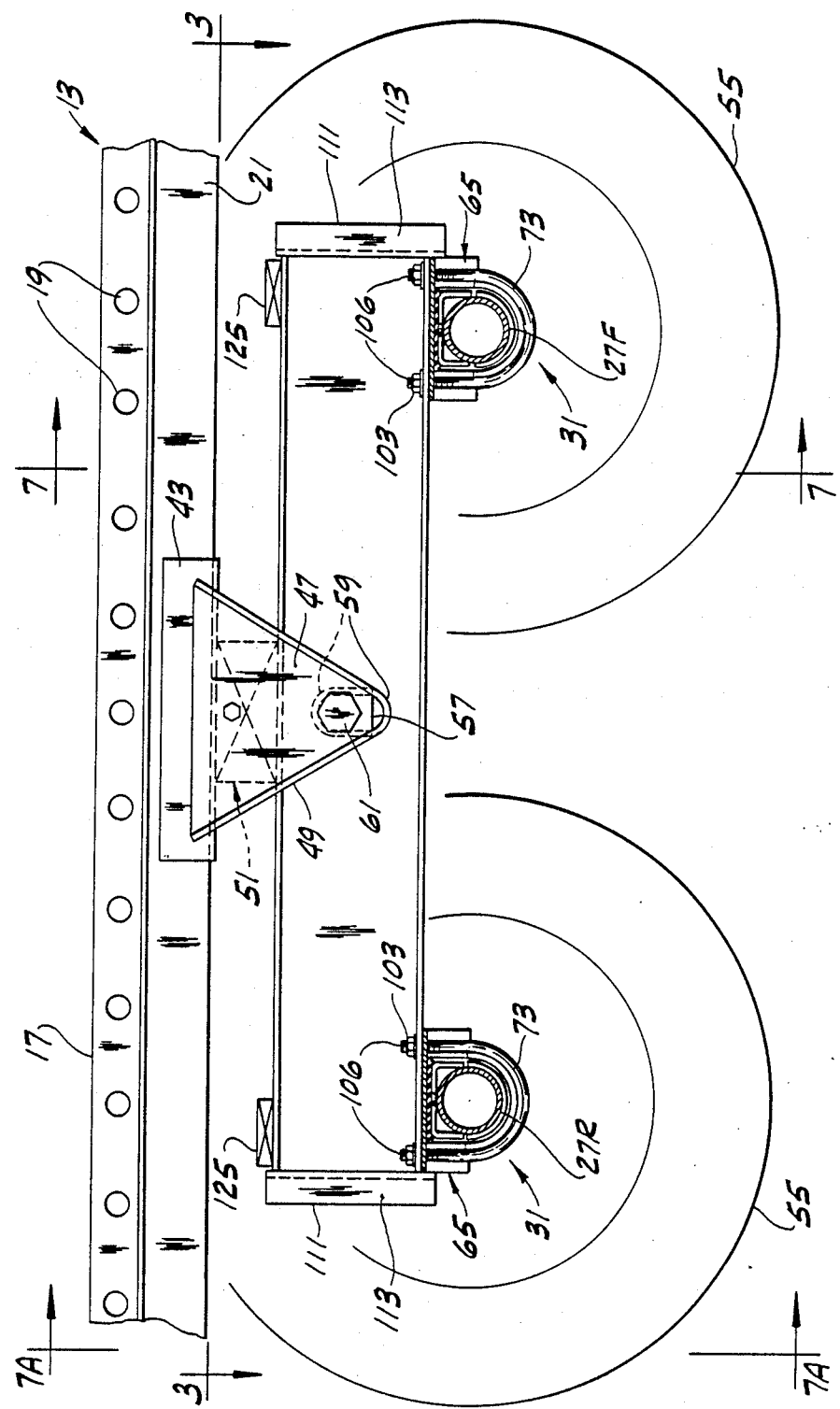
FIG. 2 is an enlarged fragment of FIG. 1 illustrating the suspension.

Means indicated at 39 located generally centrally of the beams 25 mounts the beams on the side members 21 of the slide 13 toward the sides of the body 5 of the vehicle below the bottom of the body with each beam normally in a generally vertical plane which extends longitudinally of the vehicle, with each beam extending longitudinally of the vehicle, swingable generally on an indeterminate (unfixed) axis extending transversely of the vehicle generally centrally of the length and height of the beam, and also movable bodily up and down relative to the bottom 7 of the body 5 of the vehicle. The beam swings in a generally vertical plane and is movable up and down in that plane. This means 39 comprises, for each of the walking beams 25, a hanger generally designated 41 comprising a generally U-shaped or channel-section head member 43 secured in suitable manner, e.g. by welding, to the respective side member 21 of the frame 15 of the slide 13 with the side flanges of the member 43 on opposite sides of the side member 21, and side plates 47 secured as by welding to the outside of the side flanges of the head member 43 and extending downwardly therefrom as shown best in FIG. 4. Each of these side plates 47 may be of generally triangular shape as shown in FIG. 2 and may be formed with flanges 49 at opposite edges thereof for stiffening it.

Each beam 25 extends longitudinally of the vehicle between the side plates 47 of the respective hanger 41, and elastomeric means 51 is interposed between the body 5 of the vehicle and each beam (actually between the bottom of the head member 43 of the hanger 41 and the top of the beam) resiliently supporting the body on the beams and bearing the weight of the body and its cargo and transmitting the weight to the beams generally centrally of the length of the beams. More particularly, the elastomeric means for each beam may comprise a block of a suitable elastomer, such as 60 durometer natural rubber, positioned between the bottom of the head 43 of the respective hanger 41 and the top flange 35 of the beam whereby the weight of the body of the vehicle and its cargo is transmitted via the respective rail 17 to the respective side member 21 of the frame 15 of the slide 13, the head 43 of the respective hanger 41, the respective elastomeric means 51, the respective beam 25, and the axles 27F, 27R to the wheels 55 of the vehicle and thence to the road. It will be understood that the wheels are mounted in conventional manner for rotation at the ends of the axles with the usual brakes for the wheels. While only one wheel is shown at each end of each axle, it will be understood that more than one wheel may be provided at each end of each axle, and the term "wheel" as used hereinafter is intended to cover either one or plural wheels.

Each of the walking beams 25 is provided at the center of its length with an elongate slot as indicated at 57 in its web 33 extending heightwise of the beam at right angles to the longitudinal axis of the beam, and with a reinforcing flange 59 around the slot. A pin 61 extends between the side plates 47 of each hanger 41 through the slot 57 of the respective beam. Each pin is constituted by a bolt held in place by threading a nut 63 thereon and has centered thereon a roller 64 of a diameter slightly smaller than the width of the slot 57. The pin with the roller thereon in the slot functions as means to restrain the respective beam from longitudinal movement relative to the body 5 of the vehicle. The pin and slot connection is such that the beam 25 is free or loose in the hanger to move up and down relative to the pin and roller, the hanger 41 and the bottom 7 of the body 5 of the vehicle, and free or loose in the hanger for swinging movement on an indeterminate (unfixed) axis extending generally transversely of the vehicle (and the beam) generally centrally of the beam. The pin at the right side and the pin at the left side of the suspension are coaxial, or substantially so. The pin axis remains fixed, and each beam is relatively free bodily to move up and down within the limits imposed by the slot in the beam. It will be observed that the pins do not carry any weight, the weight of the body of the vehicle (and its cargo) being transmitted as above described through the elastomeric means 51, which may be referred to as elastomeric spring cushion means, to the beams, and thence to the axles and the wheels. The beams, being free bodily to move up and down and to swing as described, may be referred to as "floating" in their hangers. In normal course, with the vehicle travelling forward, the rollers 64 on the pins engage the forward sides of the slots 57, and are slightly clear of the rearward sides of the slots.

Figure 5:
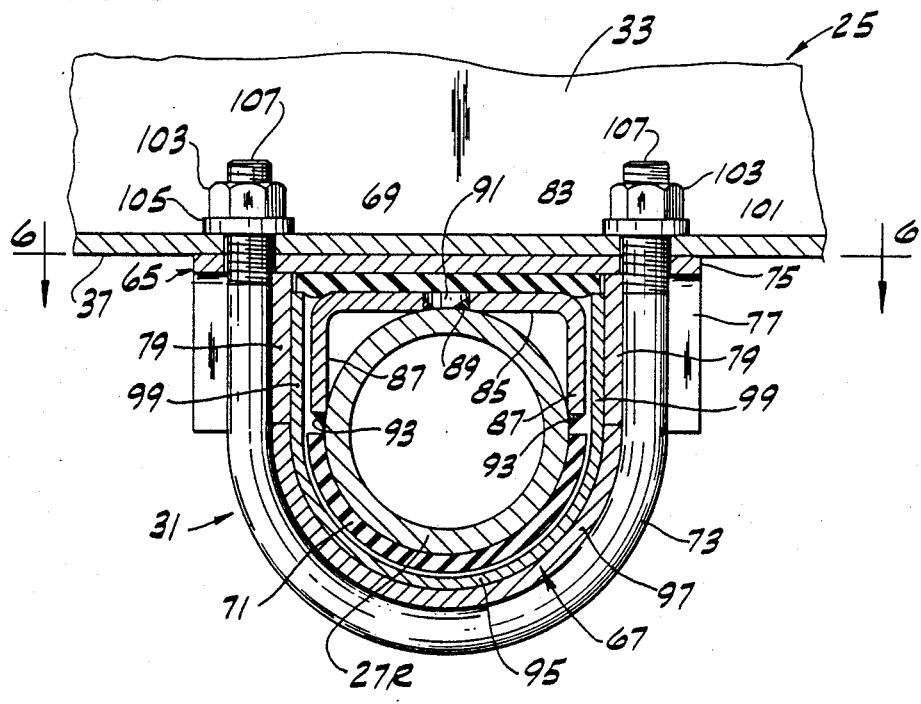
FIG. 5 is an enlarged vertical section on line 5—5 of FIG. 4 showing a special axle/beam joint of this invention.
Figure 6:
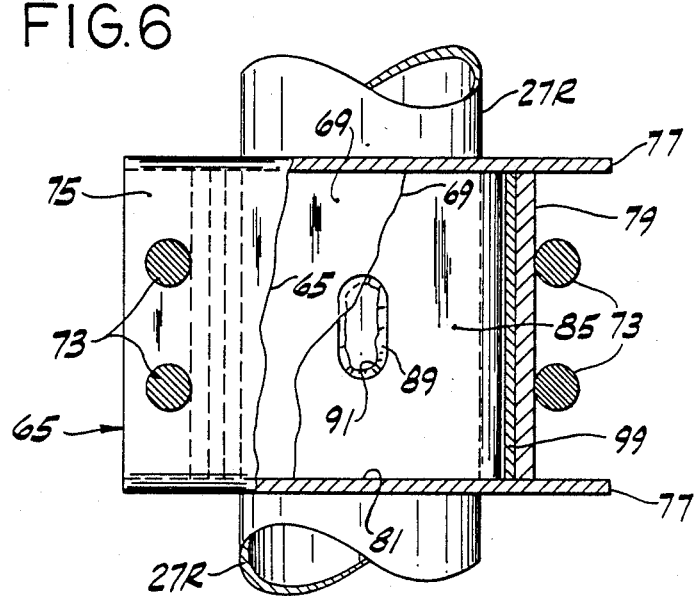
FIG. 6 is a horizontal section on line 6—6 of FIG. 5, with parts further broken away.

Each of the four special joints 31 comprises what may be referred to as an axle clamp means or axle clamp assembly for clamping each axle 27F, 27R adjacent the respective end thereof to the bottom of the respective walking beam 25 adjacent the respective end of that beam. As shown particularly in FIGS. 5 and 6, this assembly includes an upper clamp member 65 which engages the bottom flange 37 of the beam 25, a lower clamp member 67, an upper elastomeric member 69 interposed between the axle and the upper clamp member, a lower elastomeric member 71 interposed between the lower clamp member and the axle, and a pair of U-bolts each designated 73 for bolting the parts to the beam with the elastomeric members under some compression. More particularly, the upper clamp member 65 comprises a channel member, preferably a fabricated metal member, the web of which is designated 75 and the flanges of which are designated 77, with cross-partitions 79 extending between the flanges 77 spaced apart a distance somewhat greater than the axle diameter, these partitions being secured as by welding to the web and flanges, and defining in conjunction with the flanges 77 a rectangular recess as indicated at 81 in FIG. 6. The upper clamp member 65 has its web 75 engaging the bottom of the bottom flange 37 of the beam 25, its flanges 77 extending down and the recess 81 opening down. The upper elastomeric member 69 is constituted by a flat rectangular pad of an elastomeric material such as 60 durometer natural rubber and is pocketed in the recess 81 engaged flatwise against the inside of the web 75 of the upper clamp member 65.

Secured as by welding on top of the axle is a channel member 83 preferably a fabricated metal member, the web of which is designated 85 and the flanges of which are designated 87, the web engaging the top of the axle (extending tangent to the axle and horizontal) and the flanges extending down on opposite sides of the axle engaging the axle toward their lower ends. The web 85 is welded to the top of the axle as indicated at 89 via a hole 91 in the web and the flanges are welded to the sides of the axle as indicated at 93. The lower clamp member or saddle 67 comprises a U-shaped part 95 with a semi-circular part 97 on its bottom, these parts being formed of fabricated metal, for example, and being welded together. The bottom of the U-shaped part 95 is semi-circular with the diameter of the semi-circle somewhat larger than the axle diameter.

The lower or second elastomeric member 71 is constituted by a rectangular pad of an elastomeric material the same as the upper or first pad 69, being larger than the first pad and wrapped around the bottom half of the axle to constitute a resilient cushion between the lower clamp member 67 and the axle. The upper side portions 99 of the U-shaped part 95 extend up between the partitions 79 and the flanges 87 of member 83 with their upper edges engaging the upper pad 69, and the upper edges of the outer semi-circular part 97 of the lower clamp member 67 engage the lower edges of the partitions 79. The U-bolts 73 straddle the outer part 97 of the lower clamp member 67, the shanks of the U-bolts extending up on the outside of the partitions 79 through holes 101 in the web 75 of the upper clamp member 65 and the bottom flange 37 of the walking beam 25, and nuts 103 are threaded down against washers 105 on the upper ends of the shanks 106 of the U-bolts securely to bolt the assembly with the axle extending therethrough to the bottom of the bottom flange of the beam.

The assembly of the axles with the beams may be conveniently carried out by setting the beams in place upside down, i.e. setting them on what becomes their upper flanges with what becomes their lower flanges up, placing the upper clamp members 65 on the latter flanges with the bolt holes lined up, dropping in the flat pads 69, dropping in the axles with the flat faces of the webs 85 of members 83 engaging the flat pads 69, applying the pads 71, the clamp members 67, and then the U-bolts, and tightening the bolts to draw the clamp members 67 toward the clamp members 65 to the point where the edges of the part 97 engage the edges of the partitions 79, the pads being compressed to some extent.

While each axle 27F, 27R is effectively clamped to the walking beams 25 at the respective joints 31, each axle is enabled yieldingly to rotate generally about its own axis to some extent one way or the other in the joint by reason of the incorporation of the elastomeric pads 69 and 71 in the joint. Thus, as indicated by the double-headed arrow in FIG. 5, the axle may rotate clockwise or counterclockwise generally about its axis in the joint. This is to enable swinging of either one of the beams relative to the other, e.g., clockwise swing of the right-hand beam as viewed in FIG. 2 while the left-hand beam remains horizontal. The elastomeric padding in the joints also permits limited angular movement of the axles relative to the beams.

Welded to each of the walking beams 25 at each end thereof is an end plate 107 having at the edge 109 thereof toward the inside of the beam a flange 111 extending endwise from the end of the beam. The plate 107 and the flange 111 may be a one-piece structural angle member. The latter presents a flat rectangular face designated 113 at each end of each beam facing toward the inside of the beam, this face being in a plane extending longitudinally of the beam parallel to the plane of the web 33 of the beam (the central vertical longitudinal plane of the beam) inside the latter. A subframe 115 extends down from the bottom 7 of the body 5 of the vehicle, i.e. down from the slide frame 15, in a transverse plane of the vehicle at the forward ends of the beams between the flat faces 113 at the forward ends of the beams, and a similar subframe 115 extends down in a transverse plane of the vehicle at the rearward ends of the beams between the flat faces 113 at the rearward ends of the beams. The first of these subframes may be referred to as the forward subframe and the other as the rearward subframe. Each subframe, by way of example, comprises a pair of legs 117 extending down from the slide frame 15 in the respective transverse plane and a crossbar 119 at the lower ends of the legs. At the ends of the crossbar of each of the forward and rearward subframes are abutments 121 having outer faces 123 curved on an arc of a circle having its center essentially midway of the faces 113 at the ends of the beams when the beams are horizontal and the faces 113 vertical, and having a radius very slightly less than one-half the distance between the faces 113. The abutments 121, being carried by the subframe, are fixed with respect to the body of the vehicle, and are slidingly engageable by the flat faces 113 at the beam ends throughout the range of movement of the beam ends. The faces 113 or 123, or both, may be coated with an anti-friction material, e.g. TEFLON. The abutments in conjunction with the faces 113 function as means for restraining the beams from lateral movement in the horizontal position of the beams and in angular positions of the beams for holding the wheels in alignment, while allowing for the swinging of the beams. Rubber pads such as indicated at 125 are provided on the upper flanges 35 of the beams 25 adjacent their ends for engagement with the bottom of the body of the vehicle should the beams 25 swing that far.

In the course of normal travel of the vehicle on a smooth road, both the forward and rearward axles 27F and 27R are essentially horizontal and both the left and right walking beams 25 are essentially horizontal. Should both the left and right front wheels encounter a bump at the same time, the forward axle 27F moves up relative to the body of the vehicle, and the forward ends of the beams swing up and the rearward ends of the beams swing down relative to the body of the vehicle. If the bump is such that both ends of the forward axle 27F move up equally, the forward axle remains horizontal. Should both the left and right rear wheels encounter a bump at the same time, the rearward axle 27R moves up relative to the body of the vehicle and the rearward ends of the beams swing up and the forward ends of the beams swing down relative to the body of the vehicle. If the bump is such that both ends of the rearward axle 27R move up equally, the rearward axle remains horizontal. It will be readily understood that the action is the opposite of the foregoing when the front wheels encounter a depression and the rear wheels encounter a depression. When any one of the wheels encounters a bump, the respective end (left or right) of the respective axle (27F or 27R) moves up relative to the body of the vehicle and the respective end of the respective beam 25 (forward or rearward end) moves up and its other end down relative to the body of the vehicle. Thus, for example, when the right front wheel encounters a bump as illustrated in FIG. 7, the right end of the forward axle 27F moves up relative to the body of the vehicle and the forward end of the right-hand walking beam moves up and its rearward end moves down relative to the body of the vehicle. When any one of the wheels encounters a depression, the respective end of the respective axle moves down relative to the body of the vehicle and the respective end of the respective beam moves down and its other end up relative to the body of the vehicle.

Assuming the right-hand forward wheel encounters a bump, the other wheels being undisturbed, the front axle 27F angles up from left to right relative to the body of the vehicle (see FIG. 7). The forward end of the right-hand walking beam 25 moves up relative to the body of the vehicle along with the right-hand end of the axle in an essentially circular path, the forward end of the web 33 of the beam remaining essentially in fixed position relative to the axle perpendicular to the axle. The forward end of the web 33 of the beam thus angles off vertical, and the flat inner face 113 of the flange 111 at the forward end of the beam angles off vertical, maintaining tangency with the curved outer face 123 of the forward right-hand curved abutment 121. The flat inner face 113 of the flange 111 readily slides over the curved face 123 of the curved abutment 121 by reason of the provision of the anti-friction coating on one or the other of these faces. The rear axle 27R remains horizontal and the rearward end of the web 33 of the right-hand walking beam 25 remains vertical. The right-hand walking beam is thus twisted but, being an I-beam, is sufficiently flexible in twist to permit the twisting without being unduly stressed, while being relatively stiff as will be readily understood in bending to resist deflection stresses induced by the load on the beam due to the weight of the body of the vehicle and its cargo. The forward end of the web 33 of the left-hand walking beam 25 also remains essentially in fixed position relative to the axle perpendicular to the axle 27F and thus angles off vertical, maintaining tangency with the outer face 123 of the forward left-hand abutment 121. This results in twisting of the left-hand beam 25 similar to the twisting of the right-hand beam 25, with the difference that the left-hand beam remains horizontal while the right-hand beam is swung up at its forward end and down at its rearward end relative to the body of the vehicle.

As the front axle 27F angles off horizontal as above-described, it is subjected to twisting action about its own axis, and this is relieved by the rotation of the axle about its own axis in the right-hand forward joint 31 adjacent the right-hand end of the front axle as enabled by the incorporation of the elastomeric pads 69 and 71 in the joint. Here it may be mentioned that the twisting action could be taken care of by twisting of the axle itself if it were flexible enough in twist, which it generally is not, or by incorporating means in the axle enabling rotation of either end of the axle on its axis relative to the other end.

Assuming the left-hand forward wheel encounters a bump, the other wheels being undisturbed, the front axle 27F angles up from right to left relative to the body of the vehicle. 7. The forward end of the left-hand walking beam 25 moves up relative to the body of the vehicle with the left-hand end of the axle in an essentially circular path, the forward end of the web 33 of the left-hand beam remaining essentially in fixed position relative to the axle perpendicular to the axle. The forward end of the web 33 of the left-hand beam thus angles off vertical, and that flat inner face 113 of the flange 111 at the forward end of the beam angles off vertical, maintaining tangency with the curved outer face 123 of the forward left-hand curved abutment 121. The flat inner face 113 of the left-hand forward flange 111 readily slides over the curved face 123 of the left-hand forward curved abutment 121 by reason of the provision of the anti-friction coating on one or the other of these faces. The rear axle 27R remains horizontal and the rearward end of the web 33 of the left-hand walking beam 25 remains vertical. The left-hand walking beam is thus twisted but, being an I-beam like the right-hand beam, is sufficiently flexible in twist to permit the twisting without being unduly stressed, while being relatively stiff as will be readily understood in bending to resist deflection stresses induced by the load on the beam due to the weight of the body of the vehicle and its cargo. The forward end of the web 33 of the right-hand walking beam 25 also remains essentially in fixed position relative to the forward axle 27F perpendicular to the axle 27F and thus angles off vertical, maintaining tangency with the outer face 123 of the forward right-hand abutment 121. This results in twisting of the right-hand beam 25 similar to the twisting of the left-hand beam 25, with the difference that the right-hand beam remains horizontal while the right-hand beam is swung up at its forward end and down at its rearward end relative to the body of the vehicle. As the forward axle 27F angles off horizontal as above-described, it is subjected to twisting action about its own axis, and this is relieved by the rotation of the axle about its own axis in the left-hand forward joint 31 adjacent the right-hand end of the front axle as enabled by the incorporation of the elastomeric pads 69 and 71 in the joint.

Assuming the right-hand rearward wheel encounters a bump, the other wheels being undisturbed, the rearward axle 27R angles up from left to right relative to the body of the vehicle. The rearward end of the right-hand walking beam 25 moves up relative to the body of the vehicle with the right-hand end of the rearward axle in an essentially circular path, the rearward end of the web 33 of the beam remaining essentially in fixed position relative to the axle perpendicular to the axle. The rearward end of the web 33 of the right-hand beam thus angles off vertical, and the flat inner face 113 of the flange 111 at the rearward end of that beam angles off vertical, maintaining tangency with the curved outer face 123 of the rearward right-hand curved abutment 121. The flat inner face 113 of the right-hand rearward flange 111 readily slides over the curved face 12 of the right-hand rearward curved abutment 121 by reason of the provision of the anti-friction coating on one or the other of these faces. The forward axle 27F remains horizontal and the forward end of the web 33 of the right-hand walking beam 25 remains vertical. The right-hand walking beam is thus twisted. The rearward end of the web 33 of the left-hand walking beam 25 also remains essentially in fixed position relative to the rearward axle perpendicular to the rearward axle and thus angles off vertical, maintaining tangency with the outer face 123 of the rearward left-hand abutment 121. This results in twisting of the left-hand beam 25 similar to the twisting of the right-hand beam 25, with the difference that the left-hand beam remains horizontal while the right-hand beam is swung up at its rearward end and down at its forward end relative to the body of the vehicle. As the rearward axle 27R angles off horizontal as above-described, it is subjected to twisting action about its own axis, and this is relieved by the rotation of the axle about its own axis in the right-hand rearward joint 31 adjacent the right-hand end of the rearward axle as enabled by the incorporation of the elastomeric pads 69 and 71 in the joint.

Assuming the left-hand rearward wheel encounters a bump, the other wheels being undisturbed, the rearward axle 27R angles up from right to left relative to the body of the vehicle. The rearward end of the left-hand walking beam 25 moves up relative to the body of the vehicle with the left-hand end of the rearward axle in an essentially circular path, the rearward end of the web 33 of the beam remaining essentially in fixed position relative to the axle perpendicular to the axle. The rearward end of the web 33 of the left-hand beam thus angles off vertical, and the flat inner face 113 of the flange 111 at the rearward end of the beam angles off vertical, maintaining tangency with the curved outer face 123 of the rearward left-hand curved abutment 121. The flat inner face 113 of the left-hand rearward flange 111 readily slides over the curved face 123 of the left-hand rearward curved abutment 121 by reason of the provision of the anti-friction coating on one or the other of these faces. The front axle 27F remains horizontal and the forward end of the web 33 of the right-hand walking beam 25 remains vertical. The right-hand walking beam is thus twisted. The rearward end of the web 33 of the right-hand walking beam 25 also remains essentially in fixed position relative to the axle perpendicular to the rearward axle and thus angles off vertical, maintaining tangency with the outer face 123 of the rearward right-hand abutment 121. This results in twisting of the right-hand beam 25 similar to the twisting of the left-hand beam 25, with the difference that the right-hand beam remains horizontal while the right-hand beam is swung up at its forward end and down at its rearward end relative to the body of the vehicle. As the rear axle 27R angles off horizontal as above-described, it is subjected to twisting action about its own axis, and this is relieved by the rotation of the axle about its own axis in the left-hand forward joint 31 adjacent the left-hand end of the rearward axle as enabled by the incorporation of the elastomeric pads 69 and 71 in the joint.

FIG. 7A illustrates conditions when the left-hand forward wheel encounters a bump at the same time that the right-hand rearward wheel encounters a bump. In this case, the forward axle 27F angles up from right to left, and the rearward axle 27R angles up from left to right (opposite to the front axle). The forward end of the left-hand walking beam 25 swings up and its rearward end swings down. The rearward end of the right-hand walking beams 25 swings up and its forward end swings down. The forward ends of the left and right-hand walking beams 25 remain perpendicular to the forward axle, thus canting toward the left, and the rearward ends of the left and right-hand walking beams 25 remain perpendicular to the rearward axle, thus canting toward the right. The flat inner faces 113 at the ends of the beams slide over the curved outer faces 123 of the abutments 121, maintaining tangency with faces 123. This restrains the beams from lateral movement and maintains their longitudinal alignment, thus maintaining the wheel alignment. In this case, noting that each beam has its ends canted in opposite directions, each beam is twisted throughout its length from one end to the other.

Conditions incurred when the right-hand forward wheel encounters a bump at the same time that the left-hand rearward wheel encounters a bump are essentially the reverse of those described in the preceding paragraph, and need no further description.

From the above, it will appear that the body 5 of the vehicle is resiliently supported on the axles by reason of its bearing on the elastomeric supporting block or cushions 51, the weight of the body and its cargo being transmitted through this block to the walking beams 25 essentially centrally of the length of the beams and transmitted via the beams to the road, the beams equalizing the load on the axles to reduce road shock. While the beams are subject to bending and twist, the stresses to which they are subjected are readily taken by the beams, noting that the I-beam section is particularly efficient as regards withstanding bending stresses and flexibility for the twisting. No massive center pivot joints are required; as a matter of fact in effect there are no center pivot joints. The beams essentially float in the hangers; pivoting is enabled by the elastomeric block or cushion 51 which compresses at the front when the beam swings up at the front and compresses at the rear when the beam swings up at the rear. The suspension provides a relatively smooth ride due to the cushioning effect of the elastomeric block 51, and for a stable and controlled ride without brake hop such as may occur with leaf spring suspensions.

Figure 8:
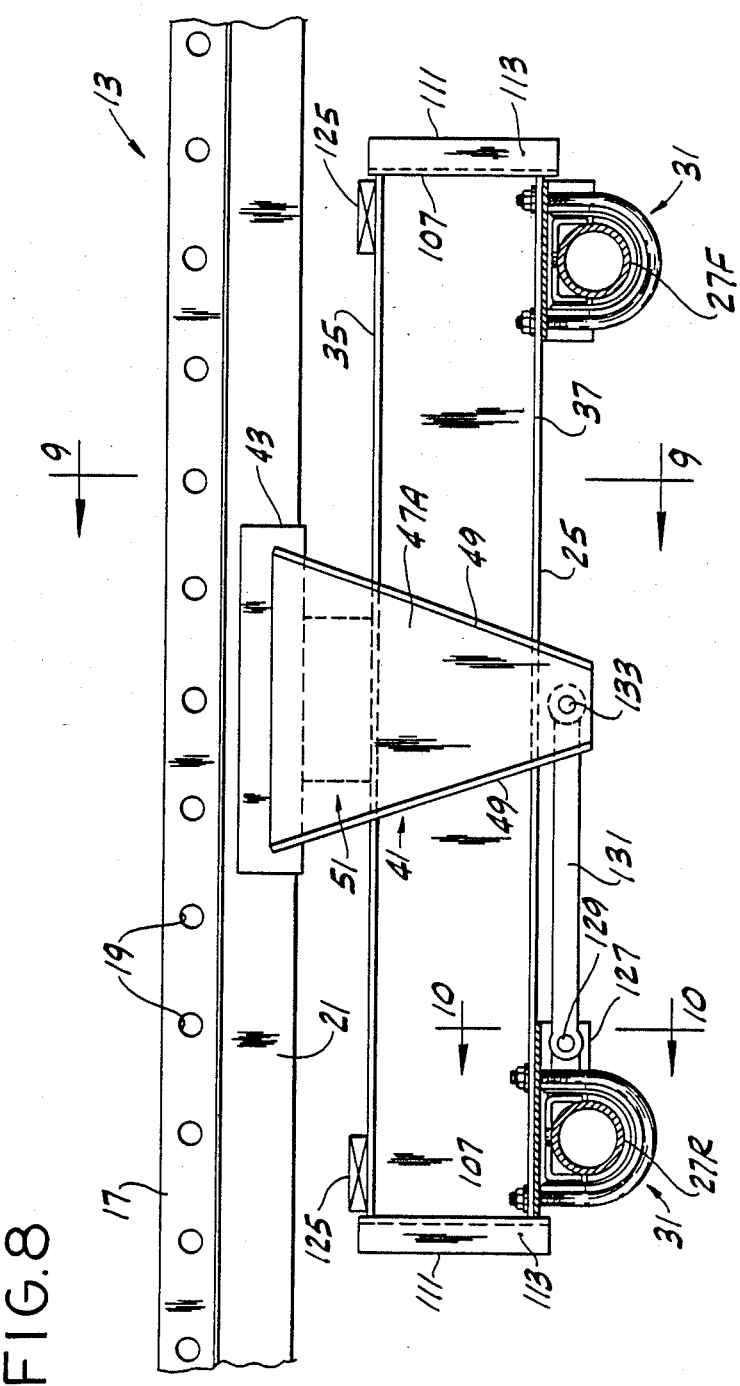
FIG. 8 is a view similar to FIG. 2 showing a modification.

In the embodiment above described, the beams are restrained from longitudinal movement by means of the pins 61 fixed with respect to the vehicle extending through slots 57 in the beams, the pin and slot connections permitting the up and down movement of the beams and their pivoting action relative to the body of the vehicle. FIGS. 8-10 illustrate second embodiment, and one that may preferred over the first, wherein each beam is restrained from longitudinal movement by means of a torque arm somewhat similar to those used in leaf spring suspensions. As shown in FIGS. 8-10, the slots 57 and pins 61 are omitted at each side. The upper clamp member 65 of each joint 31 for the rear axle 27R is extended forward to some extent as indicated at 127 in FIG. 8 and provided with a pin 129 extending between the side flanges 77 of member 65 in the extension 127. The side plates of the hanger 41, here designated 47A, are made to extend down below the beam 25. A torque arm 131 is connected between pin 129 and a pin 133 extending between the side plates 47A of the hanger below the beam. This arm pivots on pin 133 as the beam pivots and holds the beam against movement in the longitudinal direction of the beam. The torque arm at one side may be an adjustable torque arm similar to the adjustable torque arms used in leaf spring suspensions enabling ready adjustment for wheel alignment.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A suspension for tandem axles of a vehicle comprising:
 a pair of walking beams, one for the right side and one for the left side of the vehicle, and a pair of axles, one constituting a forward axle and the other a rearward axle;
 the forward axle being attached to the beams adjacent their forward ends and the rearward axle being attached to the beams adjacent their rearward ends;
 means located generally centrally of the beams mounting the beams toward the sides of the body of the vehicle below the bottom of the body with each beam extending longitudinally of the vehicle and with each beam swingable generally about the center of the length of the beam in a generally vertical plane one way or the other from a horizontal position, and also movable up and down relative to the bottom of the body of the vehicle;
 elastomeric means interposed between the body of the vehicle and each beam resiliently supporting the body on the beams, the elastomeric means bearing the weight of the body and transmitting the weight to the beams generally centrally of the length of the beams;
 means for restraining each beam from longitudinal movement; and
 means for restraining the beams from lateral movement in the horizontal position of the beams and axles and in angular positions of the beams off horizontal while allowing for the swinging of the beams,
 said means for restraining the beams from lateral movement comprising means fixed with respect to the body of the vehicle slidably engageable by the beams ends throughout their range of swing.

2. A suspension as set forth in claim 1 wherein each beam is free to float relative to its mounting means and the means restraining each beam from longitudinal movement comprises a torque arm interconnected between the respective mounting means and the beam.

3. A suspension as set forth in claim 1 wherein the means restraining each beam from longitudinal movement comprises a pin and slot connection.

4. A suspension as set forth in claim 1 wherein the axles are attached to the beams by joints which hold the beam ends essentially fixed on the axles with the beam ends generally perpendicular to the axles and vertical when the beams are in the horizontal position, the beam ends angling off vertical and moving in a circular path transverse to the vehicle on swinging of the beams, each beam being twisted as it swings one way or the other from the horizontal position.

5. A suspension as set forth in claim 4 wherein the axles are rotatable generally on their axes in the joints.

6. A suspension as set forth in claim 5 wherein each joint includes elastomeric means gripping the axles therein and yieldingly allowing said rotation of the axles in the joints.

7. A suspension as set forth in claim 1 wherein the beams are I-beams mounted with their webs vertical and their flanges at top and bottom, the elastomeric means comprising an elastomeric block interposed between the bottom of the body of the vehicle and the top flanges of the I-beams, and wherein the axles are attached to the bottom flanges of the beams by axle clamp means including an upper clamp member engaging, the bottom flange.

8. A suspension as set forth in claim 7 wherein the mounting means for each beam comprises a hanger extending down from the bottom of the body of the vehicle having side plates, each beam extending between the side plates of the respective hanger, the elastomeric means being in the hanger, the beam being free to float relative to the hanger, and the means restraining each beam from longitudinal movement comprising a torque arm connected between a pin extending between the side plates of the respective hanger below the beam and a pin carried by one of the axle clamp means associated with that beam.

9. A suspension as set forth in claim 7 wherein the mounting means for each beam comprises a hanger extending down from the bottom of the body of the vehicle having side plates, each beam extending between the side plates of the respective hanger, the elastomeric means being in the hanger, the beam being free to float in the hanger, and the means restraining each beam from longitudinal movement comprising a pin extending between the side plates of the respective hanger through a slot in the web of the beam.

10. A suspension as set forth in claim 7 wherein the axle clamp means holds the beams essentially fixed on the axles with the ends of the webs of the beams generally perpendicular to the axles and vertical when the beams are in the horizontal position, the beams having end members with inwardly directed flat faces which are vertical when the beams are in the horizontal position and which angle off vertical and move in a circular path transverse to the vehicle on swinging of the beams, each beam being twisted as it swings one way or the other from the horizontal position.

11. A suspension as set forth in claim 10 wherein the axles are rotatable generally on their axes in the axle clamp means.

12. A suspension as set forth in claim 11 wherein each axle clamp means includes elastomeric means gripping the axles therein and yieldingly allowing said rotation of the axles in the clamp means.

13. A suspension as set forth in claim 7 wherein each axle clamp means comprises, in addition to the upper clamp member, an upper elastomeric pad, a lower elastomeric pad, a lower clamp member and a pair of U-bolts, the upper clamp member having a downwardly opening recess receiving the upper pad flatwise, the axle being a round axle and having a member with a flat face engaging said upper pad, the lower pad being a flat pad wrapped around the lower half of the axle, the lower clamp member engaging the lower pad, and the U-bolts straddling the clamp members and secured to the beam at their upper ends drawing the lower clamp member up, compressing the lower pad against the axle and the upper pad between said flat face and the upper clamp member in said recess.

14. A suspension for tandem axles of a vehicle comprising:

a pair of walking beams, one for the right side and one for the left side of the vehicle, and a pair of axles, one constituting a forward axle and the other a rearward axle;

the forward axle being attached to the beams adjacent their forward ends and the rearward axle being attached to the beams adjacent their rearward ends;

means located generally centrally of the beams mounting the beams toward the sides of the body of the vehicle below the bottom of the body with each beam extending longitudinally of the vehicle and with each beam swingable generally about the center of the length of the beam in a generally vertical plane one way or the other from a horizontal position, and also movable up and down relative to the bottom of the body of the vehicle;

elastomeric means interposed between the body of the vehicle and each beam resiliently supporting the body on the beams, the elastomeric means bearing the weight of the body and transmitting the weight to the beams generally centrally of the length of the beams;

means for restraining each beam from longitudinal movement; and means for restraining the beams from lateral movement in the horizontal position of the beams and axles and in angular positions of the beams off horizontal while allowing for the swinging of the beams;

wherein the axles are attached to the beams by joints which hold the beam ends essentially fixed on the axles with the beams ends generally perpendicular to the axles and vertical when the beams are in the horizontal position, the beam ends angling off vertical and moving in a circular path transverse to the vehicle on swinging of the beams, each beam being twisted as it swings one way or the other from the horizontal position; and wherein the means for restraining the beams from lateral movement comprises means fixed with respect to the body of the vehicle below the body engageable by the beam ends, said fixed means and beam ends having interengageable surfaces with at least one of the surfaces on the fixed means and the beam ends curved in correspondence with said circular path for interengagement of said surfaces on swinging of the beams.

15. A suspension as set forth in claim 14 wherein the fixed means are on the inside of the beam ends and comprise abutments having outwardly facing surfaces engageable by inwardly facing surfaces on the beams at the beam ends, the surfaces on the abutments being curved in an arc for the said interengagement of said surfaces.

16. A suspension as set forth in claim 15 wherein the inwardly facing surfaces on the beams are flat surfaces which move generally tangent to said curved surfaces as the beams swing.

17. A suspension as set forth in claim 15 wherein said surfaces have relatively low friction engagement.

18. A suspension for tandem axles of a vehicle comprising:

a pair of walking beams, one for the right side and one for the left side of the vehicle, and a pair of axles, one constituting a forward axle and the other a rearward axle;

the forward axle being attached to the beams adjacent their forward ends and the rearward axle being attached to the beams adjacent their rearward ends;

means located generally centrally of the beams mounting the beams toward the sides of the body of the vehicle below the bottom of the body with each beam extending longitudinally of the vehicle and with each beam swingable generally about the center of the length of the beam in a generally vertical plane one way or the other from a horizontal position, and also movable up and down relative to the bottom of the body of the vehicle;

elastomeric means interposed between the body of the vehicle and each beam resiliently supporting the body on the beams, the elastomeric means bearing the weight of the body and transmitting the weight to the beams generally centrally of the length of the beams;

means for restraining each beam for longitudinal movement; and means for restraining the beams from lateral movement in the horizontal position of the beams and axles and in angular positions of the beams off horizontal while allowing for the swinging of the beams;

wherein the beams are I-beams mounted with their webs vertical and their flanges at top and bottom, the elastomeric means comprising an elastomeric block interposed between the bottom of the body of the vehicle and the top flanges of the I-beams, and wherein the axles are attached to the bottom flanges of the beams by axle clamp means including an upper clamp member engaging the bottom flange;

wherein the axle clamp means holds the beams essentially fixed on the axles with the ends of the webs of the beams generally perpendicular to the axles and vertical when the beams are in the horizontal position, the beams having end members with inwardly directed flat faces which are vertical when the beams are in the horizontal position and which angle off vertical and move in a circular path transverse to the vehicle on swinging of the beams, each beam being twisted as it swings one way or the other from the horizontal position; and having abutments fixed with respect to the body of the vehicle below the bottom of the body of the vehicle having outwardly facing surfaces curved in correspondence with said circular path engageable by said inwardly directed flat faces at said beam ends, the latter faces moving generally tangent to said curved surfaces as the beams swing.

19. A suspension for tandem axles of a vehicle comprising:

a pair of walking beams, one for the right side and one for the left side of the vehicle, and a pair of axles, one constituting a forward axle and the other a rearward axle;

the forward axle being attached to the beams adjacent their forward ends and the rearward axle being attached to the beams adjacent their rearward ends by joints which clamp the beams and axles together with the beams and axles in generally rectangular relation when the beams are in said horizontal position;

means located generally centrally of the beams mounting the beams toward the sides of the body of the vehicle below the bottom of the body with each beam extending longitudinally of the vehicle and with each beam swingable generally about the center of the length of the beam in a generally vertical plane one way or the other from a horizontal position, and also movable up and down relative to the bottom of the body of the vehicle;

elastomeric means interposed between the body of the vehicle and each beam resiliently supporting the body on the beam, the elastomeric means bearing the weight of the body and transmitting the weight of the beams generally centrally of the length of the beams;

means for restraining each beam from longitudinal movement;

means for restraining the beams from lateral movement in the horizontal position of the beams and axles and in angular positions of the beams off horizontal while allowing for the swinging of the beams; and means enabling each axle to tilt one way or the other without subjecting it to any substantial twisting on its axis on swinging of the beams one way or the other from horizontal position.

20. An axle clamp assembly for clamping an axle to part of an axle suspension, an upper clamp member, an upper elastomeric pad, a lower elastomeric pad, a lower clamp member and a pair of U-bolts, the upper clamp member having a downwardly opening recess receiving the upper pad flatwise, the axle being a round axle and having a member with a flat face engaging said upper pad, the lower pad being a flat pad wrapped around the lower half of the axle, the lower clamp member engaging the lower pad, and the U-bolts straddling the clamp members and secured to said part of the suspension at their upper ends drawing the lower clamp member up, compressing the lower pad against the axle and the upper pad between said flat face and the upper clamp member in said recess.

21. A suspension for tandem axles of a vehicle comprising:
a pair of members, one for the right side and one for the left side of the vehicle, for supporting two axles in tandem, one constituting a forward axle and the other a rearward axle, means mounting said members toward the sides of the body of the vehicle below the bottom of the body with each member extending generally longitudinally with respect to the vehicle, the forward axle being attached to said members adjacent their forward ends and the rearward axle being attached to said members adjacent their rearward ends, said members allowing for upward and downward movement and angling of the axles, and means fixed with respect to the body of the vehicle engageable by the ends of said members for restraining said members from horizontal movement while allowing for movement of their ends for the upward and downward movement and angling of the axles.

22. A suspension as set forth in claim 21 wherein said fixed means and the ends of said members have interengageable surfaces at least one of which is curved.

23. A suspension as set forth in claim 22 wherein the fixed means are on the inside of the ends of said members and comprise abutments having outwardly facing surfaces engageable by inwardly facing surfaces at the ends of said members, the surfaces on the abutments being curved.

24. A suspension as set forth in claim 23 wherein the inwardly facing surfaces on the ends of said member are flat surfaces generally tangent to the curved surfaces.

25. A suspension as set forth in claim 23 wherein said surfaces have relatively low friction engagement.

* * * * *